US008720429B2

(12) United States Patent
Lange et al.

(10) Patent No.: US 8,720,429 B2
(45) Date of Patent: May 13, 2014

(54) SAWING WIRE WITH ABRASIVE PARTICLES PARTLY EMBEDDED IN A METAL WIRE AND PARTLY HELD BY AN ORGANIC BINDER

(75) Inventors: Martin Lange, Lokeren (BE); Jan Vaneecke, Gits (BE); Rebecca Lameire, Mechelen (BE)

(73) Assignee: NV Bekaert SA, Zwevegem (BE)

( * ) Notice: Subject to any disclaimer, the term of this patent is extended or adjusted under 35 U.S.C. 154(b) by 282 days.

(21) Appl. No.: 13/260,494

(22) PCT Filed: Apr. 28, 2010

(86) PCT No.: PCT/EP2010/055680
§ 371 (c)(1), (2), (4) Date: Sep. 26, 2011

(87) PCT Pub. No.: WO2010/125085
PCT Pub. Date: Nov. 4, 2010

(65) Prior Publication Data
US 2012/0017741 A1  Jan. 26, 2012

(30) Foreign Application Priority Data

Apr. 29, 2009  (EP) ..................................... 09159096

(51) Int. Cl.
*B28D 5/04* (2006.01)
(52) U.S. Cl.
CPC ..................................... *B28D 5/042* (2013.01)
USPC .......... 125/21; 125/16.01; 125/16.02; 125/22
(58) Field of Classification Search
CPC ....... B28D 5/042; B28D 5/045; B28D 5/0005
USPC ........ 125/16.01, 21, 22; 83/651.1; 427/434.6; 451/296, 278, 330
See application file for complete search history.

(56) References Cited

U.S. PATENT DOCUMENTS

| 2,793,478 | A | * | 5/1957 | Rohowetz | ...................... | 451/539 |
| 3,375,181 | A | * | 3/1968 | Koech | .............. | 216/11 |
| 4,015,931 | A | * | 4/1977 | Thakur | .......................... | 125/21 |
| 4,187,828 | A | * | 2/1980 | Schmid | .......................... | 125/18 |
| 4,485,757 | A | | 12/1984 | Ebner | | |
| 4,913,708 | A | * | 4/1990 | Kalinowski | ..................... | 51/295 |
| 5,216,999 | A | * | 6/1993 | Han | .............................. | 125/21 |
| 5,218,949 | A | * | 6/1993 | Tomlinson et al. | ............. | 125/21 |

(Continued)

FOREIGN PATENT DOCUMENTS

| EP | 0081697 | B1 | 6/1983 |
| EP | 0243825 | B1 | 1/1994 |

(Continued)

*Primary Examiner* — George Nguyen
(74) *Attorney, Agent, or Firm* — Foley & Lardner LLP

(57) ABSTRACT

A sawing wire (100,110,120,130) with abrasive particles (20) is presented wherein the particles (20) are partly embedded in said a metallic core (14) and partly in said an organic binder layer (30). The advantage of the wire (100,110,120,130) is that the application of a metallic binder layer (30) can be avoided. Metallic binder layers add to the cost of a fixed abrasive sawing wire and in many cases pose health and safety problems which can be avoided by the use of an organic binder layer. Moreover the advantages of a good fixture of the abrasive particles in the metallic wire are maintained. Different embodiments are presented with different degrees of embedment into the metal wire.

17 Claims, 2 Drawing Sheets

(56) References Cited

U.S. PATENT DOCUMENTS

| | | |
|---|---|---|
| 6,070,570 A | 6/2000 | Ueoka et al. |
| 6,915,796 B2 * | 7/2005 | Sung ............................... 125/21 |
| 7,089,925 B1 * | 8/2006 | Lin et al. ......................... 125/21 |
| 7,270,596 B2 * | 9/2007 | Doan ............................... 451/36 |
| 7,704,127 B2 * | 4/2010 | Taniguchi et al. ............. 451/296 |
| 8,291,895 B2 * | 10/2012 | Sudarshan et al. .............. 125/21 |
| 8,348,728 B2 * | 1/2013 | Ido et al. ......................... 451/541 |
| 2002/0100469 A1 * | 8/2002 | Shimazaki et al. ............. 125/21 |
| 2004/0244789 A1 | 12/2004 | Jentgens |
| 2005/0155595 A1 * | 7/2005 | Kondo et al. ................... 125/21 |
| 2007/0261690 A1 | 11/2007 | Jentgens |
| 2010/0167634 A1 * | 7/2010 | Ido et al. ....................... 451/548 |
| 2011/0039070 A1 * | 2/2011 | Liebelt et al. ................. 428/143 |
| 2012/0138040 A1 * | 6/2012 | Barnes et al. ................... 125/21 |

FOREIGN PATENT DOCUMENTS

| | | | |
|---|---|---|---|
| EP | 0982094 A2 | 3/2000 | |
| EP | 1025942 B1 | 10/2005 | |
| GB | 1397676 | 6/1975 | |
| JP | 5-16066 A | 1/1993 | |
| JP | 06262526 A * | 9/1994 | ............... B24D 3/00 |
| JP | 10-328932 A | 12/1998 | |
| WO | WO 99/46077 A2 | 9/1999 | |
| WO | WO 03/041899 A1 | 5/2003 | |
| WO | WO 2005/011914 A2 | 2/2005 | |

* cited by examiner

United States Patent US 8,720,429 B2

SAWING WIRE WITH ABRASIVE PARTICLES PARTLY EMBEDDED IN A METAL WIRE AND PARTLY HELD BY AN ORGANIC BINDER

TECHNICAL FIELD

The invention relates to a metallic wire for sawing hard and brittle materials that has abrasive particles affixed to its outer surface. The particles are fixed to the wire by embedding them partly into the metal and partly in a polymeric binder layer. The fixed abrasive sawing wire is particularly suited to cut expensive materials where a low kerf loss and a limited surface or subsurface damage is desirable.

BACKGROUND ART

Wire saws have gradually replaced the internal diameter rotating sawing blades for cutting expensive materials that are hard and brittle. Examples of such materials are quartz (for e.g. quartz oscillators or mask blancs), silicon (for e.g. integrated circuit wafers or solar cells), germanium (e.g. as substrate for gallium arsenide solar cells), gallium arsenide (for high frequency circuitry), silicon carbide or sapphire (e.g. for blue led or blue led substrates), rare earth magnetic alloys (e.g. for recording heads) and the like. One of the driving forces for this evolution is the desire to reduce the kerf loss in the process. 'Kerf loss' is the material loss due to the abrading away of the (expensive) material. Hence, a reduced kerf loss results in a better use of material and considerable financial savings.

At the end of the previous century, multiwire saws have been developed (see e.g. GB1 397 676) that enable the cutting of thin slices (called wafers) out of single block of material. In such a multiwire saw, a single metallic wire—which makes the term 'multiwire' saw confusing—is guided over wire guides that keep the wires parallel to one another during sawing in a wire web. However, it is not the wire itself that saws, but an abrasive added to the process.

The abrasive can be added to the wire in the form of a viscous carrier (usually poly ethylene glycol) in which an abrasive (normally silicon carbide) is kept in suspension. The mixture is called 'a slurry'. The wire entrails the carrier that on its turn drags the abrasive into the cut. The abrasive abrades the block of material while it sticks and rolls in between the wire and the material. This is known as 'loose abrasive sawing' which is a kind of 'third body abrasion'. Both material and wire get abraded away which makes the continuous replacement of wire necessary. Also the slurry degrades as the abrasive particles lose their sharpness. In addition the slurry gets loaded with the swarf of the material and the debris of the wire and must be renewed regularly which brings environmental issues with it. However, the process is gentle to the material and therefore liked very much in the semiconductor industry where subsurface damage is an important issue.

In an attempt to eliminate these consumables it has been proposed to fix the abrasive to the wire in a 'fixed abrasive sawing wire'. In this way the relative movement between wire and abrasive is zero and hence the wire will not abrade. The relative movement between wire and material is doubled (relative to the loose abrasive sawing) leading to a more efficient sawing. The fixation of the abrasive has been implemented in different ways:

A first route was taken by the technologists that were familiar with the making of metallic based fixed abrasive tools such sawing blades wherein abrasive particles—usually diamonds—are embedded in a nickel coating by electroplating or electroless deposition out of a nickel bath comprising diamond particles. An example is described in EP 0 982 094 wherein a metallic wire, the embodiment of a stainless steel wire is given, is coated with nickel with diamonds. However, the use of nickel baths has raised health concerns as metallic nickel and in particular nickel salts are known to be carcinogenic (reference is made to the 30$^{th}$ amendment of EC Directive 67/548/EEC).

A second route—of which WO 99/46077 is an example—was taken by metallurgists familiar with the brazing of abrasive tooling who applied their know-how on abrasive containing brazes for coating a wire with it. However, brazing results in a considerable thermal loading of the wire which results in a loss of tensile strength of the wire (unless very particular metallic wires are used as a substrate).

A third route was taken by chemically skilled persons that sought to apply their knowledge on organic binders for abrasives for making a fixed abrasive sawing wire. There are numerous examples of which U.S. Pat. No. 6,070,570, EP 1 025 942 and WO 2005/011914 are three. Although this results in a cost effective and efficient way of fixing the abrasive on the—usually metallic—wire the fixation is not that strong and the resulting cutting speeds are lower than those obtained in the routes mentioned above. A surface treatment—such as coating the wire with a brass or copper coating or coating with a primer—is considered advantageous in U.S. Pat. No. 6,070,570.

An alternative surface treatment is suggested in JP 10 328932 wherein the surface of a piano wire is roughened by sandblasting prior to coating with an abrasive containing resin. The abrasive particles—surrounded by resin—may or may not fit into a recess of the roughened surface. No direct contact between abrasive and wire is established.

A notable exception to the use of a metallic wire substrate is WO 2003/041899 wherein manmade organic fibres (Dynema®, Nomex®, Kevlar®) are used as strength member.

Alternative development routes that sought to incorporate the abrasive particles into the skin of the metallic wire are EP 0 243 825 and EP 0 081 697:

EP 0 243 825 describes a method to produce a fixed abrasive sawing wire starting from a steel wire rod and a tube surrounding the rod with a gap in between. The gap is filled with a mixture of metal powder and abrasive particles. The ends are sealed and the rod is heat treated and cold drawn in repeated steps to obtain a fixed abrasive sawing wire after the outer tube has been removed by etching it away. Drawbacks are that the method does not allow to produce fixed abrasive sawing wires of an appreciable length (above 100 meters), the tensile strength of the resulting wire is relatively low (say below 1800 N/mm$^2$) and the resulting wires are too thick (1 mm).

EP 0 081 697 describes a method and an apparatus to incrust a wire with diamond particles. One departs from a wire that is coated with a copper or nickel layer prior to incrustation of diamond particles between hardened wheels that roll the wire around its axis through a repetitive axial movement of one or both of the wheels. Thereafter the diamonds are fixed in position by means of an electrolytically applied overcoat. Apart from the health problems with nickel and nickel salts (op cit), the application of a nickel overcoat necessitates the introduction of a plating section into a continuous process line. It adds considerable length to the overall length of the line and the ancillaries (pumping, tubing, vessels) and safety precautions make it an expensive operation.

DISCLOSURE OF INVENTION

The primary object of the present invention is therefore to overcome the problems of the known art. More particular objectives are:
- The elimination of the metallic overcoat as it adds to the cost of the product.
- In the specific case of a nickel overcoat it is an objective to eliminate the overcoat with nickel as it may cause health problems.
- To increase the useful lifetime of the sawing wire by better holding the abrasive particles.
- To increase the useful lifetime of the sawing wire by reducing corrosion of the metallic wire.
- To obtain a smooth sawing process with reduced surface or subsurface damage of the material sawn in combination with a sufficiently high sawing speed.

According a first aspect of the invention, a fixed abrasive sawing wire is provided with a metallic wire on which abrasive particles are affixed. The particles are fixed in two ways: they are partly embedded in the metallic wire and partly held to the wire by means of an organic binding layer. The fact that two totally different fixation modes—one by fixation in the metal and the other by binding with the organic layer—are used is one of the aspects of the invention. With 'partly embedded in the metallic wire' is meant that at least part of the surface of the abrasive particle is in direct contact with the metal wire. The partial embedment of the abrasive particles in the metallic layer can be achieved in a number of ways.

A first way to do this is to electrolytically grow a metal layer on a metallic core and at the same time incorporate abrasive particles in the electrolytically grown layer. Once the particles are sufficiently fixed to the wire, an organic binding layer can be applied. The metal layer can be deposited out of metal containing electrolyte wherein abrasive particles are floating. Once the abrasive particles are fixed, the metal layer can be thickened in a further bath, or the wire can be rinsed and prepared for coating with the organic binding layer.

A second way to partially embed the particles is to incrust or indent the particles into the metallic wire. Once the particles are indented, they are further bound to the wire by the organic binding layer. Incrustation can for example be done between two hardened wheels with a semicircular groove over the outer circumference. The groove has a radius slightly larger than the radius of the wire to be indented. The two grooves catch the wire while abrasive particles are fed into the gap between groove and wire.

Incrustation or indentation of the particles can be easily achieved if the metallic wire comprises a core and a metallic sheath surrounding said core. The function of the core is primarily to provide strength to the wire. The material of the core therefore must have a high tensile strength at least in the longitudinal direction of the wire. The function of the sheath is to receive and hold the abrasive particles. The sheath must therefore be softer than the core. Whether the sheath is softer than the core can readily be determined in a standard Vickers hardness test.

Preferably the core is made of a plain carbon steel although other kinds of steel such as stainless steels are not excluded. Steels are more preferred over other high tensile wires such as tungsten, titanium or other high strength alloys because it can be made easily in tensile grades above 2000 N/mm$^2$ or above 3000 N/mm$^2$ or even above 4000 N/mm$^2$, the current limit being about 4400 N/mm$^2$. This can be achieved by extensive cold forming of the wire through circular dies. The resulting metallographic structure is a fine, far-drawn perlitic structure. Alternatively the perlitic steel structure can be heat treated to transform into a martensitic structure, by preference free of bainite. Such a transformation brings some additional ductility to the wire although it results in a loss of strength.

A typical composition of a plain carbon steel for the core of the fixed abrasive sawing wire is as follows
- At least 0.70 wt % of carbon, the upper limit being dependent on the other alloying elements forming the wire (see below)
- A manganese content between 0.30 to 0.70 wt %. Manganese adds—like carbon—to the strain hardening of the wire and also acts as a deoxidiser in the manufacturing of the steel.
- A silicon content between 0.15 to 0.30 wt %. Silicon is used to deoxidise the steel during manufacturing. Like carbon it helps to increase the strain hardening of the steel.
- Presence of elements like aluminium, sulphur (below 0.03%), phosphorous (below 0.30%) should be kept to a minimum.
- The remainder of the steel is iron and other elements The presence of chromium (0.005 to 0.30% wt), vanadium (0.005 to 0.30% wt), nickel (0.05-0.30% wt), molybdenum (0.05-0.25% wt) and boron traces may improve the formability of the wire. Such alloying enables carbon contents of 0.90 to 1.20% wt, resulting in tensile strengths that can be higher as 4000 MPa in drawn wires. Hard drawn wires have a Vickers microhardness larger than 650 N/mm$^2$.

Preferred stainless steels contain a minimum of 12% Cr and a substantial amount of nickel. More preferred stainless steel compositions are austenitic stainless steels as these can easily be drawn to fine diameters. The more preferred compositions are those known in the art as AISI 302 (particularly the 'Heading Quality' HQ), AISI 301, AISI 304 and AISI 314. 'AISI' is the abbreviation of 'American Iron and Steel Institute'.

The metallic sheath can be any metal that remains softer than the core. Possible metals—without being exhaustive—are iron, copper, tin, zinc, aluminium, nickel. Also alloys such as steel, brass, bronze, zinc-aluminium, copper-nickel, copper-beryllium are possible sheath metals too.

The sheath can be applied on the final core diameter. Alternatively the sheath can be applied on intermediate diameter wires prior to drawing the wire to its final diameter. Possibly the sheathed intermediate diameter wires undergo a thermal treatment prior to drawing them further.

The sheath can be iron or steel with a lower carbon content than the core as the hardness of steel is proportional to the carbon content. The softer sheath can e.g. be the result of a controlled decarburisation of a high carbon wire or can be put on the core wire by electroplating iron or can be put on the wire by means of wrap-coating an iron or low carbon foil on the wire. As the core is made of steel and the sheath of steel or iron, diffusion of carbon between core and sheath is easy. Hence a smooth transition of high carbon to low carbon is possible in the wire. In addition the use of an organic binder layer in this case has the additional advantage that corrosion is inhibited during storage, but also during use of the wire.

For this case of a high carbon steel core that is covered with a low carbon steel sheath, explicit reference is made here to co-pending EP 09152849.7 where the structural features as described in paragraphs 18, 25 to 36 as well as the methods to make such wires as described in paragraphs 49 to 59 are of particular interest and importance to the current invention.

Alternatively, the sheath metal can be chosen not to alloy with the core metal. Whether or not the sheath does not alloy with the core has to be assessed on a case by case basis. However some metal couples are known not to form an alloy with for example a steel core. A copper or brass sheath on such a steel core will not form an alloy.

When the sheath metal does not alloy with the core metal and the sheath metal is softer than the core metal and the sheath metal is sufficiently thick, a rough interface will form between the sheath metal and the core metal provided the sheath and core have been subjected to drawing. The rough interface is particularly advantageous as it improves the adhesion between the core and the sheath by mechanical interlocking.

The sheath can be applied through wrapping a foil on an intermediate diameter wire which is a preferred method.

Another preferred method is to coat the intermediate diameter wire by running it through a bath of molten metal. This method is particularly suited to coat the wire with zinc (hot dip galvanising) or a zinc alloy—such as zinc aluminium alloy like Bezinal® coated wire of Bekaert—or copper or a copper alloy or tin.

Most preferred for coating the sheath on an intermediate wire diameter is by means of electrolytic coating out of a bath containing the sheath metal ions.

Of course the case in which no rough interface is present between the core and sheath is also explicitly included. When taking due care by cleaning and pre-treating the core properly before sheathing it, in most cases sufficient adhesion between core and sheath will be obtained. In order to obtain a smooth interface between core and sheath, the sheath is preferably applied on the final metallic wire diameter by means of electrolytic deposition out of a metal ion containing bath.

The abrasive particles are held in place partly by being embedded in the metallic wire and partly by embedment in the organic binder layer. The organic binder layer can be a thermosetting—also called thermohardening—organic polymer compound. Alternatively the binder layer can be a thermoplastic polymer compound. As thermosetting polymers—once cured—do not soften when the temperature gets higher during use they are more preferred for this kind of application.

Many thermosetting organic polymers are available in the form of either liquid or powder like resins. They can be applied to the metallic wire—with the abrasive particles embedded thereon—by the means known in the art such as leading the wire through an overflow dip tank, or through a coating curtain, or through a fluidised bed or by means of electrostatic powder or fluid deposition.

After application to the metallic wire the thermosetting polymer must be cured. Curing is mostly performed by heating up the resin above its curing temperature. Above the curing temperature a cross-linking of polymer takes place and after the curing a tough layer remains. The total heat applied to the wire during curing should remain sufficiently low such that the mechanical properties of the wire should not be affected. This can either be accomplished by limiting the temperature and/or by limiting the residence time in the heating zone.

Certain resins—e.g. epoxy resins—need a catalyst to keep the curing reaction going. Some resins—blocked one component polyurethanes for example—can be bought with the catalyst mixed in the compound. The catalyst is then activated by application of heat at a chosen moment. Alternatively the curing can be initiated by irradiation with an energetic beam such as infra-red light, ultra-violet light or an electron-beam but in these cases an adequate initiator—such as acetophenone—that is reactive to the energy beam must be used.

Most preferred thermosetting polymers for the current application are phenolic resins.

Preferred polymers are phenol formaldehyde, melamine phenol formaldehyde or acrylic based resin or amino based resins like melamine formaldehyde, urea formaldehyde, benzoguanamine formaldehyde, glycoluril formaldehyde or epoxy resin or epoxy amine.

Least preferred—but nevertheless still useable—are polyester resin or epoxy polyester or vinyl ester or alkyd based resins.

The list is non-exhaustive and other suitable polymers can be identified.

Alternatively the binder layer can be an organic thermoplastic material with a sufficiently high glass-transition temperature (say above 40° C., but preferably above 100° C.).

Preferred thermoplastic polymers are: acrylic, polyurethane, polyurethane acrylate, polyamide, polyimide, epoxy. Less preferred—but nevertheless still useable are vinyl ester, alkyd resins, silicon based resins, polycarbonates, poly ethylene terephtalate, poly butylene terephtalate, poly ether ether ketone, vinyl chloride polymers. In addition to the methods mentioned for thermosetting materials, thermoplastic binding layer can be applied through extrusion.

The organic binder layer must be sufficiently hard to endure the friction during the sawing process. It is therefore preferred that the polymer of the binder layer contains fillers that add to the strength of the layer or help to increase the thermal heat drain towards the metallic wire during use.

Typical fillers to this end can be aluminium oxides, silicon carbides, silica, chromium oxides, boron nitride, mica, talc, calcium carbonate, kaolin, clay, titanium oxide, barium sulphate, zinc oxide, magnesium hydroxide, potassium titanate, magnesium sulphate, diamond grains, metal powders or mixtures thereof.

Particularly preferred filler materials are those in the form of nano-scale particles. Typically these particles have sizes lower than 200 nm and preferably between 5 to 100 nm. Particularly preferred compositions are aluminium oxide and titanium oxides as—when mixed into the resin with moderate mass fractions of below 10 mass % or even below 5 mass % and even below 3 mass %—these particles have a beneficial effect on the wear resistance of the organic resin.

The fillers are not embedded in the metallic wire. Other ingredients such as e.g. accelerators or stabilisers can be added too.

In order to help the adhesion of the organic binder layer to the metallic wire, a primer can be used. Two types of primers which can either be used on their own or in combination are inorganic and organic primers.

A first type of primer is an inorganic primer. Examples of inorganic primers are silicates, i.e. any inorganic oxide of silicon $SiO_x$, phosphates or chromates. Most preferred are phosphates such as manganese phosphate, iron phosphate or zinc phosphate, the latter being the most preferred.

A second type of primer is an organic primer. Most preferred for this application are primers based on organo functional silanes, organo functional zirconates and organo functional titanates.

An organofunctional silane has the following formula

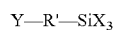

whereby
  $SiX_3$ comprises a first functional group;
  R' comprises a spacer;
  Y comprises a second functional group.
The first functional group $SiX_3$ is capable of binding to the outer metal of the wire.

X represents a silicon functional group, each of the silicon functional groups being independently selected from the group consisting of —OH, —R, —OR, —OC(=O)R and the halogens such as —Cl, —Br, —F, whereby —R is an alkyl, preferably a $C_1$-$C_4$ alkyl, most preferably —$CH_3$ and —$C_2H_5$.

The second functional group Y is directed towards the polymer material of the binding layer and is capable of binding to or interacting with at least one functional group of the polymer material. Any functional group capable of binding to or interacting with at least on functional group of the polymer material can be considered as second functional group Y. Examples comprise functional groups comprising at least one of the following groups: —$NH_2$, —NHR', —NR'$_2$, an unsaturated terminal double or triple carbon-carbon group, an acrylic, methacrylic acid group and its methyl or ethyl esters, —CN, —SH, an isocyanate group, a thiocyanate group and an epoxy groups.

The structure of zirconates and titanates is similar but in stead of a silane group a zirconate or titanate group is present.

If an inorganic and an organic primer is used, the inorganic primer is always on the metal wire and the organic primer on top of the inorganic primer. Inorganic or organic primers can be applied on the metallic wire by leading the wire through a dip tank e.g. filled with a zinc phosphate water mixture or in an alcohol-water based silane mixture, followed by drying.

The abrasive particles can be superabrasive particles such as diamond (natural or artificial, the latter being somewhat more preferred because of their lower cost and good grain friability), cubic boron nitride or mixtures thereof. For less demanding applications 'normal' abrasive particles such as tungsten carbide (WC), silicon carbide (SiC), aluminium oxide ($Al_2O_3$) or silicon nitride ($Si_3N_4$) can be used: although they are softer, they are considerably cheaper than diamond. When using the latter category of abrasive particles one should take into account the hardness of the sheath of the metallic wire in case the particles are partly embedded in the sheath through indentation (rather than depositing them through an electrolytic process). For such abrasive particles sheathing materials such as tin, aluminium and zinc are more appropriate as they are considerably softer than e.g. nickel. A too hard sheath will crush too many particles upon indentation. Of all abrasive particles the most preferred is artificial diamond as it is the hardest. Of the 'normal' abrasive particles, silicon carbide is the most preferred.

The size of the abrasive particles must somewhat scale with the diameter of the wire. Determining the size and shape of the particles themselves is a technical field in its own right. As the particles have not—and should not have—a spherical shape, for the purpose of this application reference will be made to the 'size' of the particles rather than their 'diameter' (as a diameter implies a spherical shape). The size of a particle is a linear measure (expressed in micrometer) determined by any measuring method known in the field and is always somewhere in between the length of the line connecting the two points on the particle surface farthest away and the length of the line connecting the two points on the particle surface closest to one another.

The size of particles envisaged for the fixed abrasive sawing wire fall into the category of 'microgrits'. The size of microgrits can not longer be determined by standard sieving techniques which are customary for macrogrits. In stead they must be determined by other techniques such as laser diffraction, direct microscopy, electrical resistance or photosedimentation. The standard ANSI B74.20-2004 goes into more detail on these methods. For the purpose of this application when reference is made to a particle size, the particle size as determined by the laser diffraction method (or 'Low Angle Laser Light Scattering' as it is also called) is meant. The output of such a procedure is a cumulative or differential particle size distribution with a median $d_{50}$ size (i.e. half of the particles are smaller than this size and half of the particles are larger than this size) or in general '$d_P$' wherein 'P' percent of the particles is smaller than this '$d_P$' the remaining part (100-P) percent being larger sized than this '$d_P$'.

Superabrasives are normally identified in size ranges by the referenced standard rather than by sieve number. E.g. particle distributions in the 20-30 micron class have 90% of the particles between 20 micrometer (i.e. '$d_5$') and 30 micrometer (i.e. '$d_{95}$') and less than in 1 in 1000 over 40 microns while the median size $d_{50}$ must be between 25.0+/2.5 micron.

As a rule of thumb, the median size, should be smaller than $1/6^{th}$ of the circumference of the steel wire, more preferably should be smaller than $1/12^{th}$ the circumference of the metallic wire in order to accommodate the particles well on the metallic wire. At the other extreme the particles can not be too small as then the material removal rate (i.e. the amount of material abraded away per time unit) becomes too low.

The target coverage ratio of the particles—i.e. the area covered by the abrasive particles divided by the total circumferential area of the metallic wire—is depending on the material one intends to cut, the cutting speed one wants to reach or the surface finish one wants to obtain. The inventors have found that in order to have the best sawing performance for the materials envisaged the ratio of particle area over total area should be between 1 and 50%, or between 2 to 20% or even between 2 and 10%.

Like the metallic wire, the abrasive particles can be coated with an inorganic or an organic primer or both. Suitable inorganic primers are reactive metals such as titanium, silicon, zirconium, tungsten, chromium or iron. They tend to form carbides (in case of diamond and silicon carbides) which gives a good adhesion on the particle side. Alternatively the particles can be coated with copper and nickel. Although not reactive with the particle, they give good heat conduction and offer a good foothold for the organic counterpart that can be the organic binder layer or the organic primer.

Above the inorganic primer or on the bare particle itself an organic primer can be applied. These are the same organo functional titanates, organo functionale zirconates and organo functional silanes as discussed before. The primer on the particles ensures an improved adhesion of the abrasive particles to the organic binder layer.

The depth of embedment allows for some inventive modifications of the fixed abrasive sawing wire. In a first preferred modification, the abrasive particles are deeply embedded into the metallic wire or—if present—the metallic sheath. With 'deeply embedded' it is meant that—on the average—more than two thirds of the abrasive particles' median size is embedded in the metallic wire.

This can measured by making cross-sections of the wire and polishing them up as for making a metallographic cross section. As the abrasive particles are removed from their hollows during cutting and polishing (as they are too hard to polish) the imprint of the hollow will be observable in the form of a U-shape. When now the dept of the U shape—taken from the tips—is more than $2/3^{rd}$ of the distance from tip-to-tip, the particle is considered to have been embedded more than $2/3^{rd}$ of its size. The depth of embedment must be assessed on at least 20 hollows. The average to be taken is the arithmetic average of the measured embedment depth. In this preferred embodiment, the thickness of the organic binder layer is less than $1/3^{rd}$ of the median particle size. In practice this is preferably less than 10 μm. In order to have sufficient binding at least 1 μm of organic binder layer must be present. The organic binding layer needed is relatively thin: less than about one third of the median particle size. By preference it is thicker than 1 μm to provide sufficient binding. The particles are mostly held by the underlying soft sheath metal.

In another preferred embodiment, the abrasive particles are only shallowly embedded in the metallic wire. The larger part of the abrasive particles are embedded in the organic binding layer: the thickness of the organic binder layer is at least one third of the median size of the particles. The particles are only marginally embedded in the metallic wire: the indentations on the wire are at the most half of the median particle size and preferably at the most one third of the median particle size. Such an embodiment has the advantage that the embedment of the metallic wire at least provides a hinge point for the abrasive particle, while most of the particle is held in the more resilient binding layer. It is believed that by such a configuration a 'brush' effect can be obtained, leading to a more gentle cutting than obtained with the previous embodiment.

When producing the fixed abrasive sawing wire by means of indentation of particles, the particles can be applied on the metallic wire without any organic binder followed by coating and complete cure. Alternatively the particles can be applied after the organic binder has been put on. In the latter case it is preferred to first coat the metallic wire with an organic binder layer followed by a slight curing, followed by indentation and finishing with a complete cure of the coating in order to prevent smudging of the indentation wheels during indentation.

BRIEF DESCRIPTION OF FIGURES IN THE DRAWINGS

Figures 2A, 2B:
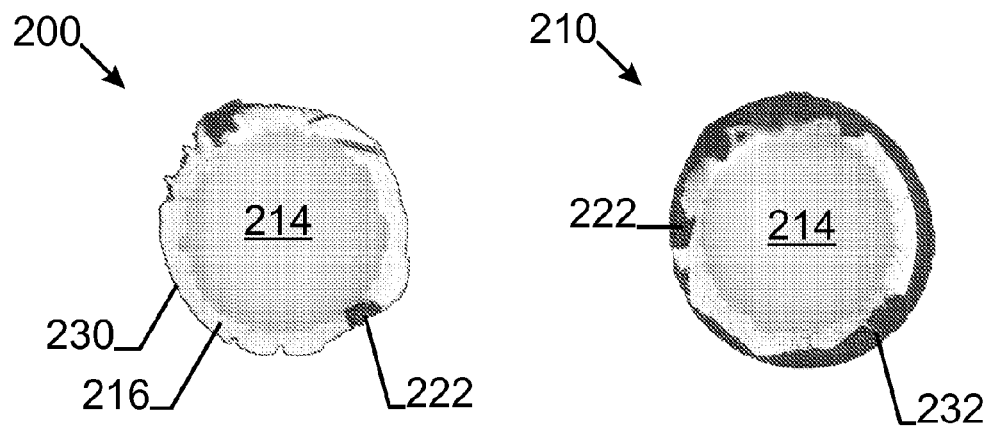

FIGS. 2a and b shows metallographic cross sections of the sawing wire according the third embodiment.

Figure 3:
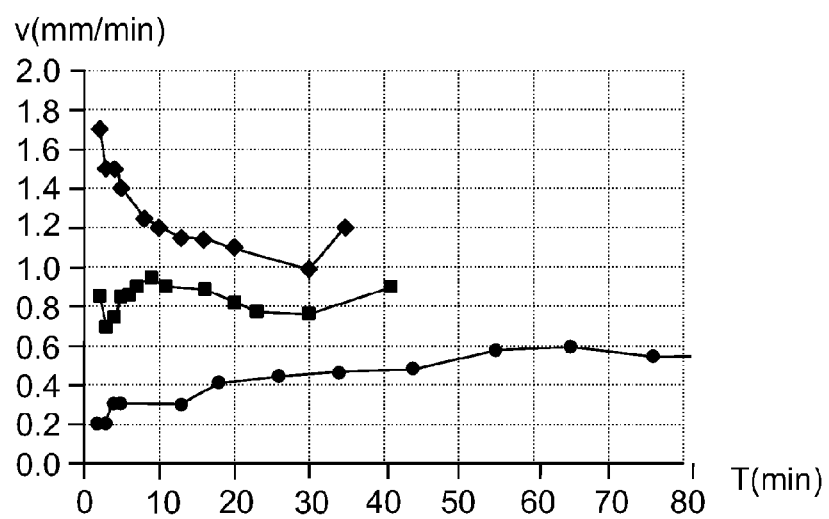

FIG. 3 shows the comparative sawing performance of the wires.

MODE(S) FOR CARRYING OUT THE INVENTION

Figures 1A, 1B:
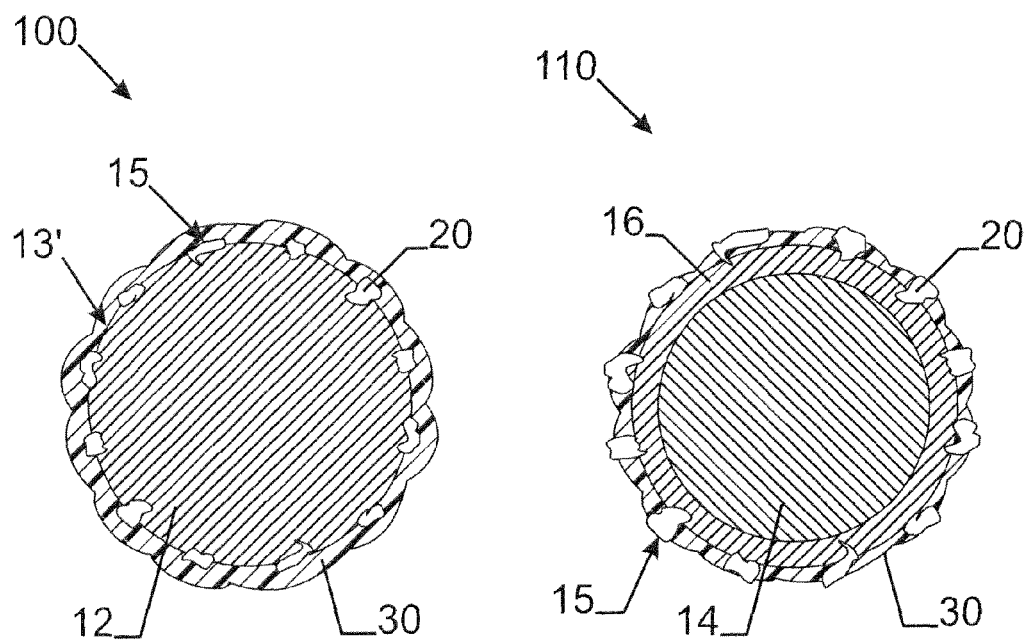
FIG. 1a shows schematically the cross section of the fixed abrasive sawing wire in its most generic form (a first preferred embodiment).
FIG. 1b shows a schematic drawing of the sawing wire according a second embodiment.

FIG. 1a shows the invention in its most generic form (first embodiment). A fixed abrasive sawing wire 100 comprises a metallic wire 12 and an organic binder layer 30. Abrasive particles 20 are fixed to the metallic wire 12 by means of the organic layer 30. Characteristic about the wire is that the abrasive particles are also partly embedded in the metallic wire. An inorganic primer coat 13' is present between the metallic wire 12 and the organic layer 30. FIG. 1b shows a second preferred embodiment wherein the metallic wire comprises a core 14 and a sheath 16 and wherein the abrasive particles are partly embedded in the sheath 16 and bound to the wire by the organic binder layer 30. The particles 20 are embedded at the most one third of their median size in the sheath layer, the remainder being bound in the organic binder layer. The particles 20 are provided with a coating 15, for example, made of titanium, further coated with a primer coat, for example, made of organo functional silanes.

Figures 1C, 1D:
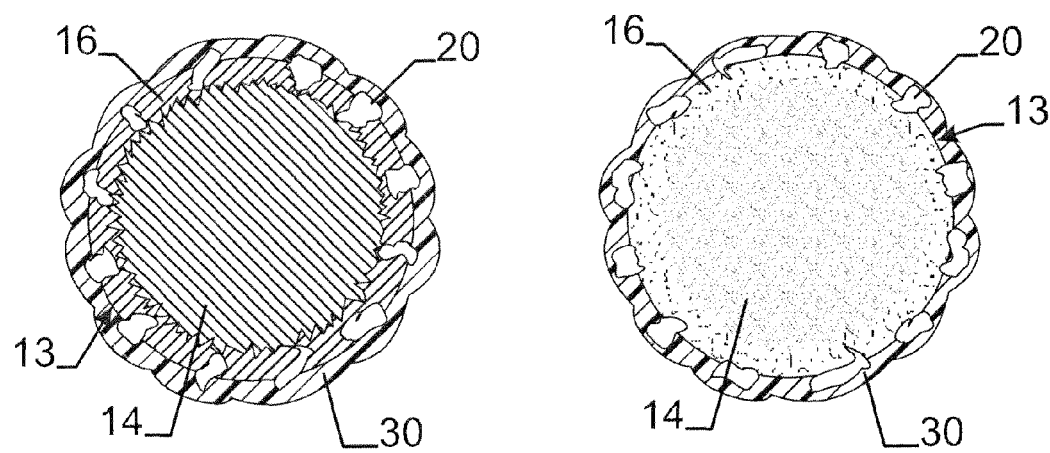
FIG. 1c shows a schematic drawing of the sawing wire according a third embodiment.
FIG. 1d shows a schematic drawing of the sawing wire in a fourth embodiment.

FIG. 1c shows a third preferred embodiment wherein the interface between the sheath 16 and the core 14 shows a certain roughness. Between the sheath 16 and the organic layer 30 a primer coat 13 is present and made, for example, of organo functional silanes. Here the particles have at least two thirds of their median size in the sheath. FIG. 1d shows a fourth preferred embodiment wherein the changeover from the core 14 to the sheath 16 is gradual and does not show a sharp interface. Again a primer coat 13 is present between the sheath 16 and the organic layer 30.

According to a first embodiment of the invention, a high carbon wire rod (nominal diameter 5.5 mm) with a carbon content of 0.8247 wt %, a manganese content of 0.53 wt %, a silicon content of 0.20 wt % and with Al, P and S contents below 0.01 wt % was chemically descaled according to the methods known in the art. The wire was dry drawn to 3.25 mm, patented and again dry drawn to 1.13 mm. A copper coating 169 micron thick or about 440 gram per kilogram of coated wire was electroplated on this intermediate diameter, which was subsequently drawn to a final overall diameter of 210 μm. The thickness of the copper layer was then about 16 μm. The breaking load of this wire was 96 N. The tensile strength of the steel core (neglecting the strength contribution of the copper sheath) is 3771 N/mm².

Diamond particles with a median size '$d_{50}$' of 25.3 μm ($d_{10}$=15.1 μm, $d_{90}$=40.6 μm) were indented into the copper sheath by two pairs of roller wheels with a matching semi circular groove of radius 109 μm. The two pairs had their axis perpendicular to one another. Hence, the particles were indented deeply into the sheath and on average two thirds of the particle was in the sheath. A sample was taken for further testing ('Sample Bare').

Subsequently the wire was electrostatically coated with an epoxy powder EP 49.7-49.9 from SigmaKalon based on Bisphenol-A (BPA) with curing agent. Subsequently the wire was cured in a run-through oven at temperature of 180° C. for about 120 to 540 seconds. The amount of organic binder layer can be varied by varying the line speed: a slower line speed collects more epoxy powder and hence the binder layer is thicker, a faster line speed results in a thinner binder layer. Two samples were produced: 'Sample Thin' (with a thin binder layer) and 'Sample Thick' (with a thicker binder layer). FIG. 2a shows a cross section 200 of Sample Thin and FIG. 2b shows a cross section 210 of Sample Thick. The core 214 is discernible as well as the sheath 216. Note that the diamonds are out of the recesses 222 in which they were held. The organic binder layer is the dark, thin layer 230 in case of Sample Thin and the clearly discernible layer 232 in case of Sample Thick.

The three wires were compared on a single wire reciprocal lab saw machine type 'Diamond Wire Technology CT800'. Half of a single crystal silicon semi-square of 125 mm width and 46.6 mm height was sawn by each of the samples (rounded corners were sawn last). The machine was operated in 'constant bow mode' set at 3°, the wire tension was kept constant at about 8 N, 30 m of wire was cycled (thro and fro) in 7 seconds giving an average speed of (2×30/7=) about 8.6 m/s. Water with an additive was used as a coolant.

The obtained results are reproduced in FIG. 3 which shows the sawing speed—i.e. the speed by which the sawing front progresses through the sample—over time. The end of the curve is when the sample is sawn through. The curve marked with diamonds (♦) is the result obtained with the Sample Bare. Initially it shows a high sawing speed that quickly diminishes due to the loss of abrasive particles.

The curve marked with squares (■) is the sawing speed obtained with the 'Sample Thin' with a thin organic binder layer. Although the curve remains somewhat below the Sample Bare the sawing speed is more constant at around 0.8 to 1.0 mm/min. Apparently the diamonds are better held and keep on functioning during sawing. The sawing speed is acceptable as it reaches 100 mm$^2$/min and more.

The curve marked with bullets (●) also shows an improving behavior of sawing speed, but the overall cutting behavior is too slow. Clearly the binder layer inhibits the abrasive particles to contact the workpiece. Only when the binder layer abrades away, the sawing speed increases.

In a second embodiment, a 225 μm copper sheathed core wire (core 175 μm, coating 25 μm) produced according the same processing route as in the first embodiment was provided. Again diamonds were deeply indented into the copper coating as in the first embodiment. The so indented diamond wire was coated in a wet chemical route ('Sample Wet 1'). To this end a mass of solid Supraplast 083093 (a phenolic resin obtainable from Süd-West Chemie, Germany) was dissolved in an equal mass of butyl alcohol. The solution was wet applied to the wire and subsequently dried (for solvent evaporation) and cured (for cross-linking) at a temperature of 180° C. for 120 seconds. A homogenous and well centered coating of about 9 μm thick was obtained. The obtained wire was tested under the same conditions as mentioned previously (CT 800; 3° constant bow, 7 seconds cycle time, 30 m of wire) but with a tension of 11 N. A full block of 125×125 mm$^2$ was cut now. The cutting was repeated three times without any substantial loss of cutting efficiency: for the first cut the cutting speed (over the width of 125 mm) was 1.45 mm/min which for the second and third cut improved to 1.50 mm/min. The cutting speed was also more constant than in the first embodiment.

In a third embodiment, a 300 μm copper sheathed (sheath thickness 25 μm) core wire produced according the same processing route as in the first embodiment was provided. Again diamonds were deeply indented into the copper coating as in the first embodiment. The sample was wet coated with an alternative material: Bakelite PF 0361 (a phenol formaldehyde, obtainable from Hexion) was dissolved in butyl alcohol resulting in a 50/50 dry residue/solvent on weight basis. After wet coating the wire it was dried and cured in an oven for 60 seconds at 180° C. The resulting coating had an average thickness of about 8 μm. This is 'Sample Wet 2'.

A comparative sawing test to a nickel coated sawing wire ('Sample Bare' coated with a nickel overstrike: 'Sample Nickel') on a 1 inch (25.4 mm) sapphire ingot was made with following machine settings:

Machine DWT CT800 (identical as in the previous tests)

Constant bow mode, bow set to 1°;

Constant wire tension of 8 N;

30 m of wire cycled to and fro at average speed of 8.6 m/s;

Coolant: water with an additive

Repeated tests were performed with the wire sample in order to assess the durability of the wire.

As shown in Table I below, the 'Sample Wet 2' performs equally well to the 'Sample Nickel'. The table shows the time (in min) needed to cut through the 1" sapphire ingot in subsequent cuts with the same piece of wire. The results support the idea of the invention that the nickel coating can be replaced with a resin coating without a loss in sawing performance.

TABLE I

| Cut number | Sample Nickel | Sample Wet 2 |
|---|---|---|
| 1 | 8 | 10 |
| 2 | 10 | 16 |
| 3 | 12 | 10 |
| 4 | 14 | |
| 5 | 20 | 21 |
| 6 | 21 | 21 |

The invention claimed is:

1. A fixed abrasive sawing wire comprising a metallic wire and abrasive particles, said abrasive particles being fixed on said metallic wire with an organic binder layer,
   wherein said metallic wire further comprises a core and a metallic sheath surrounding said core, said sheath having a lower hardness than said core, said abrasive particles being partly embedded in said sheath of said metallic wire.

2. The fixed abrasive sawing wire of claim 1 wherein said core is a plain carbon steel wire and said metallic sheath is one out of the group comprising steel, iron, copper, tin, zinc, aluminium, nickel, brass, bronze, zinc-aluminium, copper-nickel, beryllium-copper and any other alloy thereof.

3. The fixed abrasive sawing wire of claim 2 wherein said core and said sheath are made of plain carbon steel wherein a carbon content of said core is higher than a carbon content of said sheath.

4. The fixed abrasive sawing wire of claim 3 wherein a carbon content of said metallic wire gradually decreases in an outward radial direction.

5. The fixed abrasive sawing wire according to claim 2 wherein an interface of a metal of said core and a metal of said sheath do not alloy and have a rough interface so that said core and sheath mechanically interlock.

6. The fixed abrasive sawing wire according to claim 1 wherein said organic binder layer is a thermosetting polymer selected from the group comprising phenolic resin, phenol formaldehyde, melamine phenol formaldehyde or acrylic based resin or amino based resin like melamine formaldehyde, urea formaldehyde, benzoguanamine formaldehyde, glycoluril formaldehyde, epoxy, epoxy amine, polyester resin, epoxy polyester, vinyl ester, and alkyd based resins.

7. The fixed abrasive sawing wire according to claim 1 wherein said organic binder is a thermoplast selected from the group comprising acrylic, polyurethane, polyurethane acrylate, polyamide, polyimide epoxy, vinyl ester, alkyd resins, silicon based resins, polycarbonates, poly ethylene terephtalate, poly butylene terephtalate, poly ether ether ketone, and vinyl chloride polymers.

8. The fixed abrasive sawing wire according to claim 6 wherein said organic binder layer further comprises a filler selected from the group comprising aluminium oxides, silicon carbides, silica, chromium oxides, boron nitride, mica, talc, calcium carbonate, kaolin, clay, titanium oxide, barium sulphate, zinc oxide, magnesium hydroxide, potassium titanate, magnesium sulphate, diamond grains, metal powders and mixtures thereof.

9. The fixed abrasive sawing wire according to claim 6 wherein said metallic wire further comprises an inorganic primer coating selected from the group comprising silicates, phosphates and chromates.

10. The fixed abrasive sawing wire according to claim 6 wherein said metallic wire further comprises a primer coat selected from the group comprising organo functional silanes, organo functional titanates, organo functional zirconates or mixtures thereof for improved adhesion of said organic binder layer to said metallic wire.

11. The fixed abrasive sawing wire according to claim 1 wherein said abrasive particles are selected from the group comprising diamond, cubic boron nitride, silicon carbide, aluminium oxide, silicon nitride, tungsten carbide and mixtures thereof.

12. The fixed abrasive sawing wire according to claim 11 wherein said abrasive particles are coated with a coating selected from the group comprising titanium, silicon, zirconium, tungsten, chromium, iron, copper and nickel.

13. The fixed abrasive sawing wire according to claim 12 wherein said abrasive particles further comprise a primer coat selected from the group comprising organo functional silanes, organo functional titanates, organo functional zirconates and mixtures thereof for improved adhesion of said organic binder layer to said abrasive particles.

14. The fixed abrasive sawing wire according to claim 1 wherein said particles have a median particle size and are embedded into said metallic wire up to about one third of said median particle size and said organic binder is thicker than one third of said median particle size.

15. The fixed abrasive sawing wire according to claim 1 wherein said particles have a median particle size and are embedded into said metallic wire down to about two thirds of said median particle size.

16. The fixed abrasive sawing wire according to claim 7 wherein said organic binder layer further comprises a filler selected from the group comprising aluminium oxides, silicon carbides, silica, chromium oxides, boron nitride, mica, talc, calcium carbonate, kaolin, clay, titanium oxide, barium sulphate, zinc oxide, magnesium hydroxide, potassium titanate, magnesium sulphate, diamond grains, metal powders and mixtures thereof.

17. The fixed abrasive sawing wire according to claim 9 wherein said metallic wire further comprises a primer coat selected from the group comprising organo functional silanes, organo functional titanates or organo functional zirconates and mixtures thereof for improved adhesion of said organic binder layer to said metallic wire.

* * * * *